A. H. SHOEMAKER.
TREAD FOR PNEUMATIC TIRES.
APPLICATION FILED APR. 8, 1911.
1,014,912.  Patented Jan. 16, 1912.
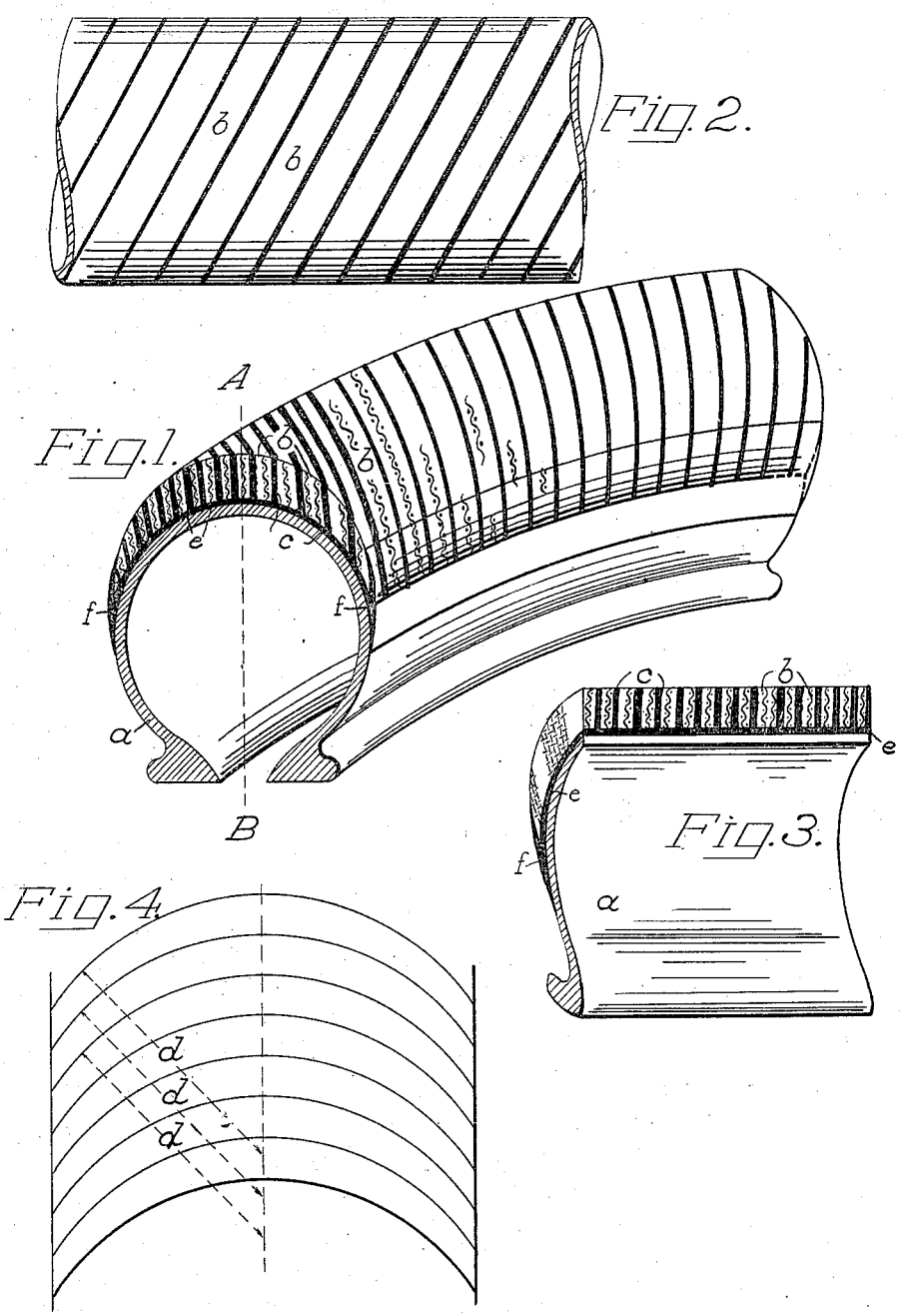
WITNESSES:
Cecil Long
W. Lewis Coop.
INVENTOR
Alvin H. Shoemaker
BY Geisler
ATTORNEY

UNITED STATES PATENT OFFICE.

ALVIN H. SHOEMAKER, OF PORTLAND, OREGON, ASSIGNOR, BY MESNE ASSIGNMENTS, TO HURLEY HERCULES PNEUMATIC TIRE COMPANY, OF PORTLAND, OREGON, A CORPORATION OF OREGON.

TREAD FOR PNEUMATIC TIRES.

1,014,912.   Specification of Letters Patent.   Patented Jan. 16, 1912.

Application filed April 8, 1911. Serial No. 619,851.

*To all whom it may concern:*

Be it known that I, ALVIN H. SHOEMAKER, a citizen of the United States, and a resident of Portland, county of Multnomah, and State of Oregon, have invented a new and useful Improvement in Treads for Pneumatic Tires, of which the following is a specification.

My invention relates to pneumatic tires of vehicles and has for its object to obtain a durable, inexpensive tread, which also possesses the non-skidding property. To attain these objects, I make the tread of my wheel of a plurality of strips of suitable material set up edgewise, that is, with the warp of the strips perpendicular to and the strips arranged diagonally across the body of the tire so as to attain greater wear. I also mount said strips on a cushion of elastic material, cemented to the exterior of the casing, and place layers of elastic material intermediate of said strips; the cushion and intermediate layers being preferably of rubber. And finally I vulcanize the tread on the tire into a homogeneous body. The cushion at the juncture between the base of the strips and the casing, and likewise the elastic intermediate layers, are necessary for preventing the strips of the composite tread from pulling loose from the casing and from each other. In other words, the described construction is necessary to render the composite tread pliable and flexible, but will be able to accommodate themselves to the contortions of the inflated wheel tire as a whole, while in service and supporting the load of the vehicle.

In the accompanying drawings constituting a part of this specification: Figure 1 is a vertical section of my improved tire, also showing a portion thereof in perspective; Fig. 2 is a partial top view of my tire as it appears in practice, except that, of course, the intermediate elastic layers would now show as prominently as represented; Fig. 3 is a vertical section on line A—B of Fig. 1; and Fig. 4 is a diagrammatic top view illustrating the mode in which the diagonally arranged strips, of which my tread is composed, are cut, so as to adapt such strips to my particular purpose, and also with reference to economy with regard to the material out of which the strips are cut.

The casing, $a$, may be of any common convenient fabric. It is coated with rubber cement on the exterior, and it is then covered with a composite tread, comprising a plurality of strips, $b, b$, preferably cut out of belting composed of fabric impregnated with rubber. The strips, $b, b$, are conveniently made by a knife cutting the arc of a circle whose center is moved equal distances along the longitudinal center of the belt strip, as illustrated in Fig. 4, the broken lines, $d, d$, designating the radii of the arc described by the knife while cutting the strips. The strips, $b, b$, are preferably cut out of belting. By belting I mean the material commonly used for making machine belts. The strips are cut out of the flat surface of the belting, but when they are applied to the casing or body of the tire they are turned on an end, so as to bring the warp perpendicular to the casing.

On the exterior of the casing, $a$, is provided a peripheral cushion $e$, preferably of pure rubber, and between the strips, $b, b$, are interposed layers of yielding material, also preferably of pure rubber $c$. The strips and layers of the composite tread are cemented together and the composite tread and cushion are cemented on the casing; and finally the composite tire is vulcanized into a homogeneous body. The purpose of arranging the strips on an end, that is to say, so as to bring the warp perpendicular to the casing, is to obtain a tread surface that will not skid. By following the mode described for cutting the strips, there is no waste of material and the tread, when finished, has its greatest thickness at the point where subjected to the hardest wear and it tapers down at the sides to the underlying case. I prefer also to face the portions, $f$, $f$, of the sides of the tire with pure rubber, as shown more clearly in Fig. 1. By arranging the strips, $b, b$, diagonally the non-skidding property of my tread is increased. The same arrangement, furthermore, has a tendency to neutralize any stripping of the strips one from the other, since the impact of the tread at any point with the ground would deliver more of a glancing blow against the strips instead of a direct blow. The same arrangement of my strips also increases their length, and hence gives a greater area to their abutting cemented side-faces, and in so doing gives to such cemented side-faces greater power to withstand the stress tending to pull them apart. The functions of the cushion base $e$ and of the intermediate elastic layers $c$ have already been described. The elastic strip, $f$, at both sides of the tire prevents the stripping of the extremities of the bottom edges of the strips, $b$, $b$, from the sides of the casing or body of the tire.

I claim:

A pneumatic tire comprising a body portion provided on its outer surface with a peripheral layer of rubber, a plurality of alternate strips of fabric and rubber beyond the layer of rubber on the body portion, each layer of fabric and rubber being crescent shape and arranged perpendicular to and diagonally across the peripheral layer of rubber on the body portion; the outer edges of the crescent shape strips of fabric forming with the alternate strips of rubber a crescent shape tread, and the strips of rubber between the fabric merging into and forming part of the layer of rubber on the body portion, the ends of said strips of rubber being elongated and merging into and forming a part of the side portions of said peripheral layer of rubber on the body portion.

ALVIN H. SHOEMAKER.

Witnesses:
 CECIL LONG,
 W. LEWIS COOP.

Copies of this patent may be obtained for five cents each, by addressing the "Commissioner of Patents, Washington, D. C."